United States Patent
Brahner et al.

(10) Patent No.: US 10,124,766 B2
(45) Date of Patent: Nov. 13, 2018

(54) METHOD FOR CONTROLLING THE OPERATION OF AT LEAST ONE FUNCTIONAL COMPONENT OF A MOTOR VEHICLE AND MOTOR VEHICLE

(71) Applicants: AUDI AG, Ingolstadt (DE); VOLKSWAGEN AG, Wolfsburg (DE)

(72) Inventors: Tom Brahner, Ingolstadt (DE); Florian Pleban, Bad Abbach (DE); Robert Helene Escherich, Boehmfeld (DE); Ralf Augustin, Ingolstadt (DE); Boris Hackstein, Wolfsburg (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 100 days.

(21) Appl. No.: 15/517,447

(22) PCT Filed: Dec. 10, 2015

(86) PCT No.: PCT/EP2015/002487
§ 371 (c)(1),
(2) Date: Apr. 6, 2017

(87) PCT Pub. No.: WO2016/091388
PCT Pub. Date: Jun. 16, 2016

(65) Prior Publication Data
US 2018/0265037 A1  Sep. 20, 2018

(30) Foreign Application Priority Data

Dec. 11, 2014 (DE) ............ 10 2014 018 460

(51) Int. Cl.
*B60R 25/20* (2013.01)
*B60R 25/104* (2013.01)
*B60R 16/03* (2006.01)

(52) U.S. Cl.
CPC ........ *B60R 25/2018* (2013.01); *B60R 25/104* (2013.01); *B60R 25/2009* (2013.01);
(Continued)

(58) Field of Classification Search
CPC ............. B60R 25/2018; B60R 25/104; B60R 25/2009; B60R 25/2063; B60R 16/0315; B60R 2325/205
(Continued)

(56) References Cited

U.S. PATENT DOCUMENTS 7,796,021 B2 * 9/2010 Saban .................... B60N 2/002
340/438
8,957,760 B2 * 2/2015 Nishijima ............... B60L 11/14
307/10.4

(Continued)

FOREIGN PATENT DOCUMENTS

DE  197 20 285 A1  11/1998
DE  101 18 298 A1  11/2002

(Continued)

OTHER PUBLICATIONS

International Search Report for PCT/EP2015/002487 dated Feb. 29, 2016, 3 pp.

(Continued)

*Primary Examiner* — Yazan A Soofi
(74) *Attorney, Agent, or Firm* — Staas & Halsey LLP

(57) ABSTRACT

After authenticating at least one functional component which is safety-relevant and/or emission-relevant to the driving mode of the motor vehicle with regard to whether the functional component is an original component of the motor vehicle or a functional component which has been replaced without authorization and/or has been manipulated without authorization, the operation of at least one other functional component of the motor vehicle is controlled in such a (Continued)

manner that the functionality or at least one functionality of the at least one other functional component is selectively restricted if the authentication which has been carried out reveals that the at least one functional component which is safety-relevant and/or emission-relevant to the driving mode of the motor vehicle has been replaced without authorization and/or has been manipulated without authorization.

19 Claims, 2 Drawing Sheets

(52) U.S. Cl.
CPC ...... *B60R 25/2063* (2013.01); *B60R 16/0315* (2013.01); *B60R 2325/205* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 9,082,239 | B2* | 7/2015 | Ricci | B60Q 1/00 |
| 9,248,821 | B2* | 2/2016 | Moebus | B60W 10/18 |
| 9,759,916 | B2* | 9/2017 | Beckman | G02B 27/01 |
| 2009/0153311 | A1* | 6/2009 | Lee | B60R 25/2018 |
| | | | | 340/426.1 |
| 2010/0010698 | A1* | 1/2010 | Iwashita | B60L 3/12 |
| | | | | 701/22 |
| 2012/0123611 | A1* | 5/2012 | Grasso | B60R 25/00 |
| | | | | 701/1 |
| 2012/0313796 | A1* | 12/2012 | Lee | B60R 25/2018 |
| | | | | 340/989 |
| 2014/0263323 | A1* | 9/2014 | Thorstensen-Woll | |
| | | | | B65D 17/50 |
| | | | | 220/258.3 |
| 2015/0161836 | A1* | 6/2015 | Park | G07C 9/00134 |
| | | | | 340/5.51 |

FOREIGN PATENT DOCUMENTS

| | | |
|---|---|---|
| DE | 103 46 735 A1 | 5/2005 |
| DE | 10 2005 024 818 A1 | 11/2006 |
| DE | 10 2011 077 472 A1 | 12/2012 |
| DE | 10 2011 077 475 A1 | 12/2012 |
| DE | 102014018460.9 | 12/2014 |
| EP | 2 192 532 A2 | 6/2010 |
| EP | 2 644 461 A1 | 10/2013 |
| WO | 2012/171759 A1 | 12/2012 |
| WO | PCT/EP2015/002487 | 12/2015 |

OTHER PUBLICATIONS

German Office Action for Application No. 102014018460.9 dated Dec. 3, 2015, 5 pp.
English Translation by WIPO of the Internationals Preliminary Report on Patentability for PCT/EP2015/002487 dated Jun. 15, 2017.
Office Action dated Feb. 13, 2018, in corresponding Chinese Patent Application No. 201580056780.4, 5 pgs.

* cited by examiner

METHOD FOR CONTROLLING THE OPERATION OF AT LEAST ONE FUNCTIONAL COMPONENT OF A MOTOR VEHICLE AND MOTOR VEHICLE

CROSS REFERENCE TO RELATED APPLICATIONS

This application is the U.S. national stage of International Application No. PCT/EP2015/002487, filed Dec. 10, 2015 and claims the benefit thereof. The International Application claims the benefit of Application No. 10 2014 018 460.9 filed on Dec. 11, 2014, both applications are incorporated by reference herein in their entirety.

BACKGROUND

Described below is a method for controlling the operation of at least one functional component of a motor vehicle.

The problem of the unauthorized replacement of particular motor vehicle functional components, during which original components of the motor vehicle are replaced with stolen functional components, for example, without authorization, and the problem of the unauthorized manipulation of particular motor vehicle functional components are known.

Such unauthorized replacement and such unauthorized manipulation can be detected by authentication between respective functional components and a control device. The authentication can be implemented, for example, using so-called challenge-response authentication, during which encrypted information, for example in the form of numerical codes, and functional-component-specific decryption results of respective encrypted information are interchanged between respective functional components. If the decryption results interchanged between respective functional components match, there is successful authentication. If the decryption results interchanged between respective functional components do not match, there is no successful authentication.

In the event of unsuccessful authentication of a functional component, it has hitherto been common practice to selectively restrict the functionality of at least this functional component in order to indicate the unsuccessful authentication of a particular functional component to a vehicle occupant.

However, this procedure cannot be pursued for the situation in which functional components of the motor vehicle which are safety-relevant and/or emission-relevant to the driving mode could not be successfully authenticated since the functionality of corresponding functional components which are safety-relevant and/or emission-relevant to the driving mode is not intended to be restricted, in principle.

SUMMARY

The method for controlling the operation of at least one functional component of a motor vehicle includes
authenticating at least one functional component which is safety-relevant and/or emission-relevant to the driving mode of the motor vehicle with regard to whether the functional component is an original component of the motor vehicle or a functional component which has been replaced without authorization and/or has been manipulated without authorization, and
controlling the operation of at least one other functional component of the motor vehicle in such a manner that the functionality or at least one functionality of the at least one other functional component is selectively restricted if the authentication which has been carried out reveals that the at least one functional component of the motor vehicle which is safety-relevant and/or emission-relevant to the driving mode of the motor vehicle has been replaced without authorization and/or has been manipulated without authorization.

Although only two steps of the method are mentioned above, the method may include which may be carried out before, after or between what is described above.

The method for controlling the operation of at least one functional component of a motor vehicle, as described herein, fundamentally belongs to the field of the theft protection of particular functional components of the motor vehicle, that is to say functional components which are safety-relevant and/or emission-relevant to the driving mode in particular. Unauthorized replacement or unauthorized manipulation of safety-relevant and/or emission-relevant functional components, in particular, can be rendered noticeable to a vehicle occupant via the method without producing a safety risk for the driving mode or without increasing the emissions and the typically associated consumption for the driving mode. On account of particular legal provisions, for example in the USA, it may be the case that the emissions or the consumption of the motor vehicle must not be increased without a notice to a vehicle occupant, in particular the driver, or a report to an authority.

The method may begin by authenticating at least one functional component which is safety-relevant and/or emission-relevant to the driving mode of the motor vehicle with regard to whether the functional component is an original component of the motor vehicle or a functional component which has been replaced without authorization and/or has been manipulated without authorization. Such functional components which are safety-relevant and/or emission-relevant to the driving mode of the motor vehicle are referred to as first functional components below.

Such a first functional component of the motor vehicle may be, for example, a motor vehicle electrical energy store, in particular an electrical energy store which is or can be assigned to a motor vehicle drive unit, traction energy store for short, or control electronics associated with the energy store. Such a traction energy store is both safety-relevant and emission-relevant with regard to the driving mode. The latter results, for the example of a hybrid motor vehicle which, in addition to a drive unit in the form of an electric motor which is supplied via a corresponding traction energy store, also has at least one further drive unit in the form of an internal combustion engine, with regard to the safety relevance, from the fact that a functional restriction or deactivation of a drive unit is fundamentally of safety-relevant significance to the driving mode and, with regard to the emission relevance, from the fact that the emissions in the driving mode are increased as a result of the electric motor being deactivated or the motor vehicle being driven solely via the internal combustion engine(s).

Thus, the control electronics associated with a corresponding electrical energy store can be authenticated, for example, to determine whether these are the original control electronics or control electronics which have been replaced without authorization and/or have been manipulated without authorization.

If the authentication of the at least first functional component of the motor vehicle reveals that the at least one first functional component has been replaced without authorization and/or has been manipulated without authorization, the operation of at least one other functional component of the motor vehicle is controlled in such a manner that the functionality or at least one functionality of the at least one other functional component is selectively restricted.

It is therefore important that, in the event of unsuccessful authentication of at least one first functional component (that is to say at least one functional component which is safety-relevant and/or emission-relevant to the driving mode of the motor vehicle), there is selective intervention, in terms of control technology, in the operation of at least one other functional component, for example a functional component which is not safety-relevant and/or emission-relevant to the driving mode of the motor vehicle, in such a manner that the functionality or at least one functionality of the at least one other functional component is selectively restricted or influenced. The functionality or functional readiness and therefore the operation of the first functional component which has not been successfully authenticated are therefore not adversely affected irrespective of the authentication result.

In connection with the above-mentioned example of an electrical energy store as a corresponding first functional component, the unauthorized installation of a stolen electrical energy store, for example, therefore becomes "unattractive". This is because negative authentication of the electrical energy store which can be attributed to unauthorized replacement restricts the functionality of at least one other functional component. A similar situation applies to the unauthorized replacement of other first functional components which are therefore safety-relevant and/or emission-relevant to the driving mode and to unauthorized manipulation of other first functional components.

Irrespective of the type of functional component(s) to be authenticated, the authentication can be carried out using any desired authentication methods. As a possible authentication method, reference is made, only by way of example, to the challenge-response authentication mentioned at the outset, during which encrypted information, for example in the form of typically randomized numerical codes, and functional-component-specific decryption results of respective encrypted information are interchanged between respective functional components or between control units associated with the functional components. If the decryption results interchanged between respective functional components match, there is successful authentication. If the decryption results interchanged between respective functional components do not match, there is no successful authentication.

Unauthorized replacement or unauthorized manipulation can be understood as meaning, in particular, replacement which is not carried out upon the request of the vehicle owner in an expert manner, typically in a workshop, or manipulation of a corresponding functional component of the motor vehicle which is not carried out upon the request of the vehicle owner in an expert manner, typically in a workshop. A criminal intention of the person carrying out the replacement without authorization or the person carrying out the manipulation without authorization may be linked to unauthorized replacement or unauthorized manipulation.

A restriction of the or a functionality of a corresponding functional component can typically be understood as meaning a restriction of the range of functions of the functionality or of at least one functionality of the functional component, in particular in comparison with normal operation which can naturally depend on external and internal operating circumstances, in particular aging-related or use-related operating circumstances. A restriction of the or a functionality can also mean complete deactivation of the or a functionality of a respective functional component.

The method is typically implemented using a central control device ("master") which communicates with respective functional components of the motor vehicle, that is to say in particular with respective control units of respective functional components of the motor vehicle, via a motor vehicle data network, for example a BUS network. The central control device can be used both to authenticate functional components and to intervene, in terms of control technology, in the operation and therefore in the functionality or at least one functionality of functional components.

It is conceivable that, before authenticating at least one first functional component with regard to whether the functional component is an original component of the motor vehicle or a functional component which has been replaced without authorization and/or has been manipulated without authorization, at least one functional component of the motor vehicle which is relevant to safety-relevant and/or legal provisions irrespective of the driving mode of the motor vehicle is authenticated with regard to whether the functional component is an original component of the motor vehicle or a functional component which has been replaced without authorization and/or has been manipulated without authorization. Such functional components of the motor vehicle which are relevant to safety-relevant and/or legal provisions irrespective of the driving mode of the motor vehicle are referred to as second functional components below. It is therefore possible to authenticate at least one second functional component before authenticating corresponding first functional components. In this manner, the operational safety of respective second functional components can be increased and particular legal provisions can be complied with. A second functional component may be, for example, a motor vehicle night-vision device which, on account of legal provisions, is not intended to be used outside the motor vehicle. A corresponding night-vision device is therefore expediently authenticated before authenticating other functional components, that is to say first functional components, in particular. The night-vision device is deactivated if successful authentication is not possible.

The operation of the at least one second functional component and/or of at least one other functional component of the motor vehicle can be controlled in such a manner that the functionality or at least one functionality of the at least one second functional component and/or of the at least one other functional component is selectively restricted if the authentication which has been carried out reveals that the at least one second functional component has been replaced without authorization and/or has been manipulated without authorization.

Before authenticating at least one first functional component with regard to whether the (first) functional component is an original component of the motor vehicle or a functional component which has been replaced without authorization and/or has been manipulated without authorization, or before authenticating at least one second functional component with regard to whether the (second) functional component is an original component of the motor vehicle or a functional component which has been replaced without authorization and/or has been manipulated without authorization, a status query of a device preventing unauthorized activation of the motor vehicle can be carried out. Such a device may be, for example, a motor vehicle engine immobilizer.

In this case, at least one first functional component can be authenticated with regard to whether the functional component is an original component of the motor vehicle or a functional component which has been replaced without authorization and/or has been manipulated without authorization, or at least one second functional component of the motor vehicle can be authenticated with regard to whether the functional component is an original component of the motor vehicle or a functional component which has been replaced without authorization and/or has been manipulated without authorization, only if the status query reveals that there is no unauthorized activation of the motor vehicle.

A corresponding device which prevents unauthorized activation of the motor vehicle can therefore be incorporated in the method. This is expedient in so far as a corresponding device can be used to check authentication of an ignition key or another element for starting the motor vehicle, that is to say a motor vehicle drive unit in particular, and such (attempted) unauthorized starting of the motor vehicle prevents authentication of further functional components. Without such authentication, these functional components typically cannot be activated. In this manner, the theft protection which can be implemented using the method is improved.

As mentioned, as at least one other functional component of the motor vehicle, the functionality or at least one functionality of a functional component which is not safety-relevant to the driving mode of the motor vehicle, in particular, can be selectively restricted if the authentication which has been carried out reveals that the at least one first functional component of the motor vehicle has been replaced without authorization and/or has been manipulated without authorization. Such functional components which are not safety-relevant to the driving mode of the motor vehicle are referred to as third functional components below.

Examples of corresponding third functional components which are therefore not safety-relevant to the driving mode of the motor vehicle are given below.

A third functional component may be, for example, a multimedia device for outputting multimedia contents into the interior of the motor vehicle or to a communication partner, for example a vehicle occupant mobile terminal, for example a mobile telephone, a smartphone, a notebook, a tablet, etc., a communication device for establishing a communication connection between a motor vehicle control unit and a communication partner, for example a vehicle occupant mobile terminal, for example a mobile telephone, a smartphone, a notebook, a tablet, etc., an air-conditioning device for air-conditioning at least one region of the interior of the motor vehicle, a seat adjustment device for adjusting at least an orientation and/or position of at least one seat part of the motor vehicle relative to at least one other seat part of the motor vehicle, a seat temperature control device for controlling the temperature of at least one seat part of the motor vehicle, a steering wheel temperature control device for controlling the temperature of at least one steering wheel part of the motor vehicle, an illumination device for illuminating the interior of the motor vehicle, or else a parking assistance system for carrying out at least partially automated parking operations of the motor vehicle. It is clear from the above non-conclusive list that the corresponding third functional components are, in particular, so-called comfort devices for enhancing the comfort of vehicle occupants.

As a specific example of a corresponding restriction of the operation of a third functional component in the form of a multimedia device, a particular multimedia program, for example a particular TV and/or radio station, a particular picture and/or sound setting, in particular a volume setting, may be permanently predefined or unavailable, for example. A similar situation applies to the restriction of the functionality or at least one functionality of other third functional components.

Alternatively or additionally, as at least one other functional component of the motor vehicle, the functionality or at least one functionality of a further first functional component which is therefore safety-relevant and/or emission-relevant to the driving mode of the motor vehicle can also be selectively restricted, in principle, if the authentication which has been carried out reveals that the at least one first functional component of the motor vehicle has been replaced without authorization and/or has been manipulated without authorization. This further first functional component is not the previously authenticated first functional component.

In order to avoid a safety risk as a result of the functionality or at least one functionality of a further first functional component being restricted, before restricting the functionality or at least one functionality of a further first functional component, an item of restriction information describing an imminent or given restriction of the further first functional component is expediently output to at least one vehicle occupant, in particular a driver. A vehicle occupant, in particular the driver, can therefore be advised of an imminent or given restriction of the functionality or at least one functionality of a further first functional component by a corresponding item of restriction information. The restriction information can be acoustically and/or optically and/or haptically output via suitable output devices, for example loudspeakers and/or displays and/or vibration devices. An item of restriction information can be output, for example, in the form of the lighting-up of a signal lamp or signal display, possibly in combination with a warning tone.

As a further first functional component which is therefore safety-relevant and/or emission-relevant to the driving mode and the functionality or at least one functionality of which is possibly restricted, an assistance system or driver assistance system which directly or indirectly controls the driving mode, in particular an assistance system or driver assistance system for at least partially automated longitudinal and/or lateral guidance of the motor vehicle, or an illumination or headlamp device for illuminating the exterior around the motor vehicle can be provided, for example, within the scope of the method. As mentioned, an imminent or given restriction of the functionality or at least one functionality of such a further first functional component which is safety-relevant and/or emission-relevant to the driving mode is expediently indicated to the vehicle occupant(s) by a corresponding item of restriction information.

If an authentication result cannot be created when carrying out the authentication, in particular of a first functional component, a particular number of authentication attempts can be carried out. In this case, the functionality or at least one functionality of the at least one other functional component is selectively restricted if an authentication result was still not created after carrying out the particular number of authentication attempts. Authentication attempts which take place while carrying out the authentication can therefore be recorded using implemented counters, for example. If a predefinable or predefined number of authentication attempts is exceeded, that is to say 10 unsuccessful authentication attempts for example, the functionality or at least one functionality of another functional component can be selectively restricted, in a similar manner to the case of unauthorized replacement or unauthorized manipulation of a corresponding functional component. This increases the reliability of the method, in particular with regard to the detection of a functional component which has been replaced without authorization and/or a functional component which has been manipulated without authorization.

With the same objective, the functionality or at least one functionality of the at least one other functional component of the motor vehicle can be selectively restricted if an authentication result was not created within a particular period while carrying out the authentication. The carrying-out of the authentication can be temporally recorded using implemented time measuring devices, for example. A corresponding period may be, for example, a period between 1 and 30 seconds. It goes without saying that the period may also be selected to be shorter or longer.

The method may be implemented in a motor vehicle having a plurality of different functional components, in particular with regard to their safety relevance to the driving mode, and a control device. The control device is set up, in particular according to the described method, to authenticate at least one first functional component which is safety-relevant and/or emission-relevant to the driving mode of the motor vehicle with regard to whether the functional component is an original component of the motor vehicle or a functional component which has been replaced without authorization and/or has been manipulated without authorization, and to control the operation of at least one other functional component of the motor vehicle in such a manner that the functionality or at least one functionality of the at least one other functional component is selectively restricted if the authentication which has been carried out reveals that the at least one first functional component of the motor vehicle which is safety-relevant and/or emission-relevant to the driving mode of the motor vehicle has been replaced without authorization and/or has been manipulated without authorization.

All statements made in connection with the method similarly apply to the motor vehicle.

BRIEF DESCRIPTION OF THE DRAWINGS

These and other aspects, advantages, features and details will become more apparent and more readily appreciated from the following description of exemplary embodiments, taken in conjunction with the accompanying drawings of which.

DETAILED DESCRIPTION OF THE PREFERRED EMBODIMENT

Figure 1:
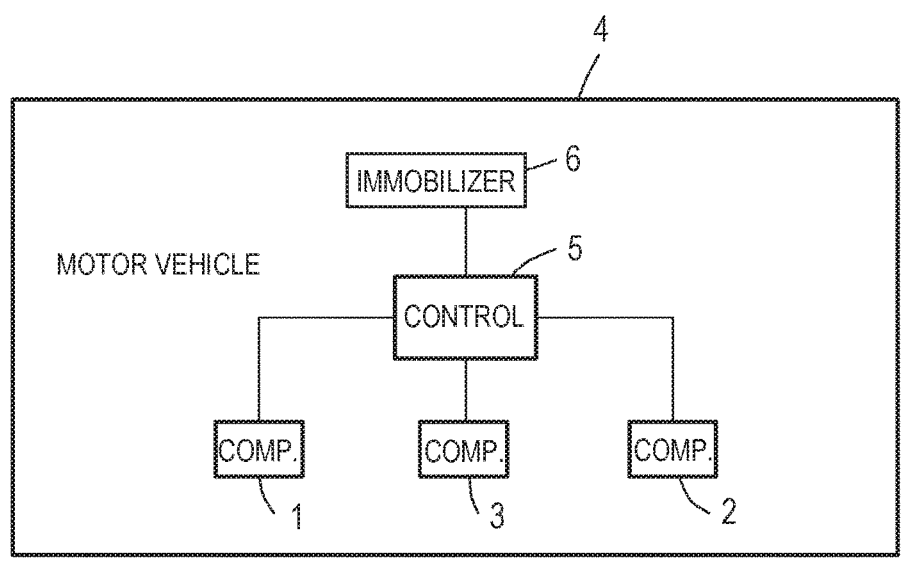
FIG. 1 is a block diagram of a motor vehicle according to one exemplary embodiment.

Reference will now be made in detail to the preferred embodiments, examples of which are illustrated in the accompanying drawings, wherein like reference numerals refer to like elements throughout.

FIG. 1 shows a basic illustration of a motor vehicle 4 according to one exemplary embodiment. The motor vehicle 4 has a plurality of functional components 1, 2, 3 with respective control units (not shown) and a control device 5 which communicates with the functional components via a motor vehicle data network, in particular a central BUS network, such as a CAN bus.

The functional component 1 is a functional component which is safety-relevant and/or emission-relevant to the driving mode of the motor vehicle 4, namely an electrical energy store. At least one motor vehicle drive unit (not shown) is supplied with electrical energy via the electrical energy store. The electrical energy store is therefore a traction energy store. Consequently, the motor vehicle 4 may be a so-called hybrid motor vehicle which has at least one drive unit which is in the form of an electric motor and can be driven with electrical energy and a further drive unit in the form of an internal combustion engine. Even though only a single functional component 1 is illustrated, a plurality of functional components 1 which are safety-relevant and/or emission-relevant to the driving mode of the motor vehicle 4 are typically present. In particular, an assistance system which directly or indirectly controls the driving mode, for example an assistance system for at least partially automated longitudinal and/or lateral guidance of the motor vehicle 4, and/or an illumination or headlamp device for illuminating the exterior around the motor vehicle 4 may be present as a further functional component 1 which is safety-relevant and/or emission-relevant to the driving mode of the motor vehicle 4. Corresponding functional components 1 which are safety-relevant and/or emission-relevant to the driving mode of the motor vehicle 4 are referred to as first functional components 1 below.

The functional component 2 is a functional component which is relevant to safety-relevant and/or legal provisions irrespective of the driving mode of the motor vehicle 4, namely a night-vision device. Even though only a single functional component 2 is illustrated, it also goes without saying for the functional component 2 that a plurality of functional components 2 which are relevant to safety-relevant and/or legal provisions irrespective of the driving mode of the motor vehicle 4 may be present. Corresponding functional components 2 which are relevant to safety-relevant and/or legal provisions irrespective of the driving mode of the motor vehicle 4 are referred to as second functional components 2 below.

The functional component 3 is, for example, a functional component which is not safety-relevant to the driving mode of the motor vehicle 4, namely a multimedia device which is installed in a combination instrument of the motor vehicle 4, for example, and is intended to output multimedia contents, in particular image and/or audio contents, into the interior of the motor vehicle 4 and/or to a communication partner, for example a vehicle occupant mobile terminal, for example in the form of a mobile telephone, a smartphone, a notebook, a tablet. Even though only a single functional component 3 is illustrated, a plurality of functional components 3 which are not safety-relevant to the driving mode of the motor vehicle 4 are typically present. Corresponding functional components 3 which are not safety-relevant to the driving mode of the motor vehicle 4 are referred to as third functional components 3 below.

As further third functional components 3, a communication device for establishing a communication connection between a motor vehicle control unit and a communication partner, for example a vehicle occupant mobile terminal, for example a mobile telephone, a smartphone, a notebook, a tablet, etc., an air-conditioning device for air-conditioning at least one region of the interior of the motor vehicle 4, a seat adjustment device for adjusting at least an orientation and/or position of at least one seat part of the motor vehicle 4 relative to at least one other seat part of the motor vehicle 4, a seat temperature control device for controlling the temperature of at least one seat part of the motor vehicle 4, a steering wheel temperature control device for controlling the temperature of at least one steering wheel part of the motor vehicle 4, an illumination device for illuminating the interior of the motor vehicle 4, or else a parking assistance system for carrying out at least partially automated parking operations of the motor vehicle 4 may be present, for example. The third functional components 3 are typically so-called comfort devices for enhancing the comfort of vehicle occupants.

In addition to the functional components 1, 2, 3, the motor vehicle 4 also has a device 6 which prevents unauthorized activation of the motor vehicle 4. Such a device 6 is a motor vehicle engine immobilizer.

The control device 5 is set up to carry out a method for controlling the operation of respective functional components 1, 2, 3. An exemplary embodiment of the method is explained in more detail below with reference to the flowchart shown in FIG. 2.

Figure 2:
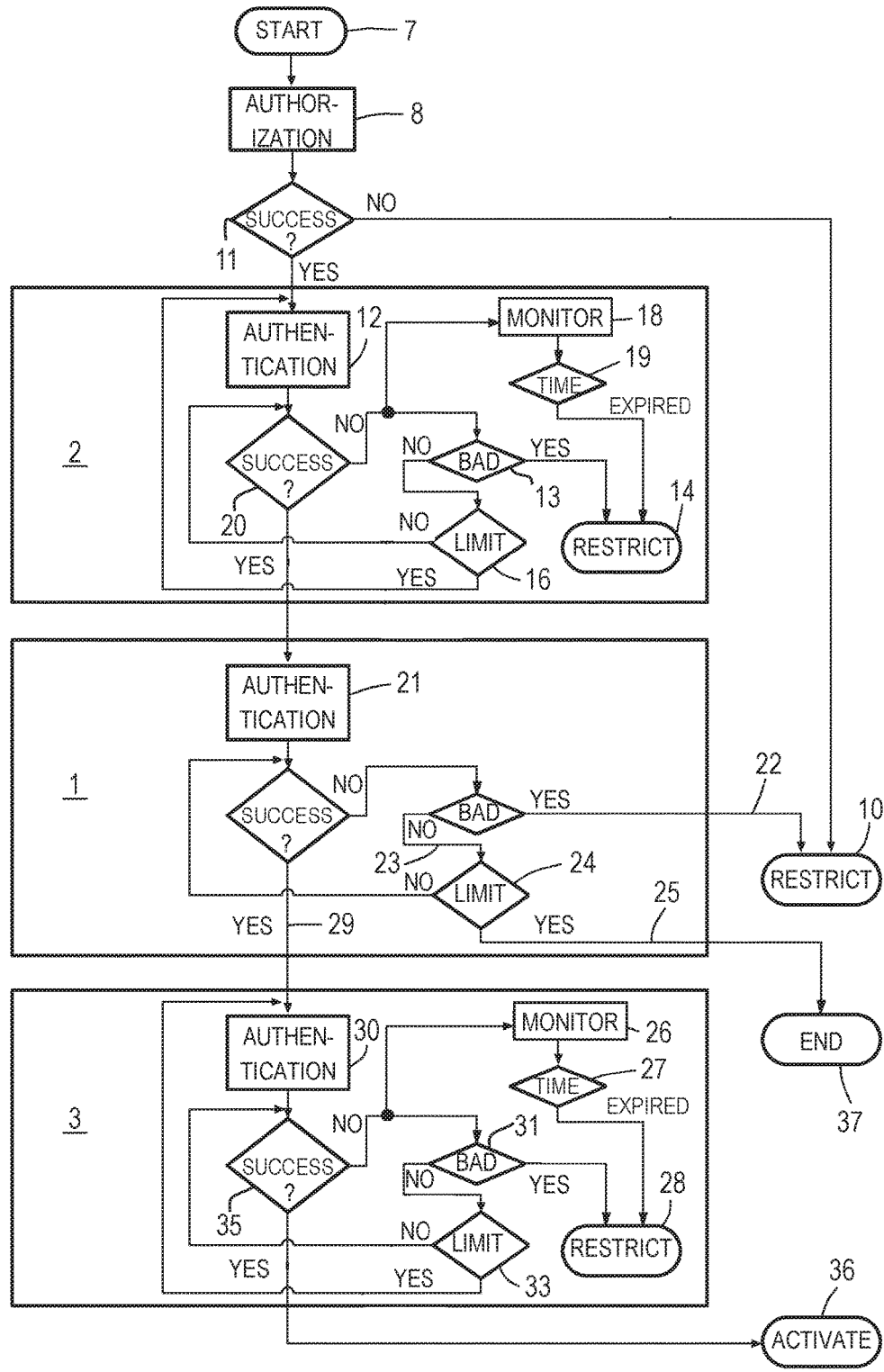
FIG. 2 is a flowchart of a method for controlling the operation of at least one functional component of a motor vehicle according to one exemplary embodiment.

The method described below with reference to FIG. 2 fundamentally belongs to the field of the theft protection of particular functional components 1 of the motor vehicle 4, that is to say in particular first functional components which are therefore safety-relevant and/or emission-relevant to the driving mode. Unauthorized replacement or unauthorized manipulation of first functional components 1, in particular, can be rendered noticeable via the method without producing a safety risk for the driving mode of the motor vehicle 4 or without increasing the emissions and the typically associated consumption for the driving mode of the motor vehicle 4.

In the box 7, the motor vehicle 4 is first of all started, with the result that the control device 5 is activated.

An authorization status query 8 of the device 6 preventing unauthorized activation of the motor vehicle 4 is then carried out. This is expedient in so far as a corresponding device 6 can be used to check authentication of an ignition key or another element for starting the motor vehicle 4, that is to say a drive unit of the motor vehicle 4 in particular, and such (attempted) unauthorized starting of the motor vehicle 4 prevents authentication of further functional components 1, 2, 3. Without such authentication, these functional components 1, 2, 3 cannot be activated. In the event of a negative query result (NO), that is to say (attempted) unauthorized access was detected, the functionality of all functional components 1, 2, 3 is already restricted or deactivated 10 at this point via the control device 5.

In the event of a positive query result (success 11), that is to say no (attempted) unauthorized access was detected, the second functional component 2 which is therefore relevant to safety-relevant and/or legal provisions irrespective of the driving mode of the motor vehicle 4 is authenticated. The authentication 12 is carried out with regard to whether the second functional component 2 is an original component or a functional component 2 which has been replaced without authorization and/or has been manipulated without authorization.

Three different scenarios are fundamentally possible when authenticating the second functional component 2:

If there is negative authentication of the second functional component 2, that is to say there is a second functional component 2 which has been replaced without authorization and/or has been manipulated without authorization 13, the functionality of the second functional component 2 is selectively restricted 14 via control technology intervention by the control device 5. This may also be complete deactivation of the second functional component 2.

If it is not possible to authenticate the second functional component 2 or if an authentication result cannot be created, a particular number of further authentication attempts, for example 10 further authentication attempts, is carried out 16. Depending on whether or not authentication is possible, the process returns to box 20 or 12.

The carrying-out of the authentication is temporally monitored 18. If an authentication result was not created within a particular period 19 during the (attempted) authentication of the second functional component 2, the functionality of the second functional component 2 is selectively restricted 14 via a control technology intervention by the control device 5. Such a period may be, for example, a period between 1 and 30 seconds.

If there is positive authentication of the second functional component 2, that is to say there is no second functional component 2 which has been replaced without authorization and/or has been manipulated without authorization (authentication success 20), the first functional component 1 is authenticated 21.

Three different scenarios are also fundamentally possible when authenticating the first functional component 1:

If there is negative authentication of the first functional component 1, that is to say there is a first functional component 1 which has been replaced without authorization and/or has been manipulated without authorization (see arrow 22), the functionality of at least one third functional component 3, in particular all third functional components 3 which are therefore not safety-relevant to the driving mode of the motor vehicle 4 are selectively restricted 10 via a control technology intervention by the control device 5. This may also be complete deactivation of the third functional components 3.

As a specific example of a corresponding restriction of the operation of a third functional component 3 in the form of a multimedia device, a particular multimedia program, for example a particular TV and/or radio station, a particular picture and/or sound setting, in particular a volume setting, may be permanently predefined or unavailable, for example.

If it is not possible to authenticate the first functional component 1 or if an authentication result cannot be created (see arrow 23), a particular number of further authentication attempts, for example 10 further authentication attempts, is carried out 24. If the first functional component 1 is still not authenticated if the particular number of authentication attempts has been exceeded (see arrow 25), the authentication process is ended 37.

If there is positive authentication of the first functional component 1, that is to say there is no first functional component 1 which has been replaced without authorization and/or has been manipulated without authorization (see arrow 29), the third functional component 3 which is not safety-relevant to the driving mode of the motor vehicle 4 is authenticated 30.

Three different scenarios are also fundamentally possible when authenticating the third functional component 3:

If there is negative authentication of the third functional component 3, that is to say there is a third functional component 3 which has been replaced without authorization and/or has been manipulated without authorization 31, the functionality of the third functional component 3 is selectively restricted 28 via a control technology intervention by the control device 5. This may also be complete deactivation of the third functional component 3.

If it is not possible to authenticate the third functional component 3 or if an authentication result cannot be created (see arrow 32), a particular number of further authentication attempts, for example 10 further authentication attempts, is carried out 33. Depending on whether or not authentication is possible, the process returns to box 35 or 30.

As mentioned, the carrying-out of the authentication is temporally monitored (cf. box 26). If an authentication result was not created within a particular period 27 during the (attempted) authentication of the third functional component 3, the functionality of the third functional component 3 is selectively restricted 28 via a control technology intervention by the control device 5. As mentioned, such a period may be, for example, a period between 1 and 30 seconds.

If there is positive authentication of the third functional component 3, that is to say there is no third functional component 3 which has been replaced without authorization and/or has been manipulated without authorization (authentication success 35), all functional components 1, 2, 3 of the motor vehicle 4 are activated 36 without restricting a functionality.

It is important that, in the event of unsuccessful authentication of at least one first functional component 1 which is therefore safety-relevant and/or emission-relevant to the driving mode of the motor vehicle 4, there is selective intervention, in terms of control technology, in the operation of at least one other functional component 2, 3, typically a third functional component 3 which is not safety-relevant to the driving mode of the motor vehicle 4, in such a manner that the functionality or at least one functionality of the at least one other functional component 2, 3 is selectively restricted or influenced. The functionality of the first functional component 1 which is to be authenticated or has been authenticated and is safety-relevant and/or emission-relevant to the driving mode of the motor vehicle 4 is therefore not adversely affected irrespective of the authentication result.

The functional components 1, 2, 3 can be authenticated, for example, using challenge-response authentication, during which encrypted information, for example in the form of typically randomized numerical codes, and functional-component-specific decryption results of respective encrypted information are interchanged between respective functional components 1, 2, 3 or between control units belonging to the latter and the control device 5. If the decryption results interchanged between respective functional components 1, 2, 3 and the control device 5 match, there is successful authentication. If the decryption results interchanged between respective functional components 1, 2, 3 and the control device 5 do not match, there is no successful authentication.

Within the scope of the method, it is also possible, as at least one other functional component of the motor vehicle 4, for the functionality or at least one functionality of a further first functional component 1 which is therefore safety-relevant and/or emission-relevant to the driving mode of the motor vehicle 4, for example a driver assistance system for at least partially automated longitudinal and/or lateral guidance of the motor vehicle 4 and/or an illumination or headlamp device for illuminating the exterior around the motor vehicle 4, to also be selectively restricted, in principle, if the authentication which has been carried out reveals that the at least one first functional component 1 has been replaced without authorization and/or has been manipulated without authorization.

In order to avoid a safety risk as a result of the functionality or at least one functionality of a further first functional component 1 being restricted, before restricting the functionality or at least one functionality of a further first functional component 1, an item of restriction information describing an imminent or given restriction of the further first functional component 1 is output to at least one vehicle occupant, in particular a driver. The restriction information can be acoustically and/or optically and/or haptically output via suitable output devices (not shown), for example loudspeakers and/or displays and/or vibration devices.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for controlling operation of functional components of a motor vehicle, comprising:
   authenticating at least one functional component, at least one of safety-relevant and emission-relevant to a driving mode of the motor vehicle, with regard to whether the at least one functional component has been at least one of replaced without authorization and manipulated without authorization, and
   controlling operation of at least one other functional component of the motor vehicle, not safety-relevant to the driving mode of the motor vehicle, by selectively restricting at least one functionality of the at least one other functional component when said authenticating reveals that the at least one functional component of the motor vehicle has been at least one of replaced without authorization and manipulated without authorization.

2. The method as claimed in claim 1, further comprising authenticating, before said authenticating of the at least one functional component, at least one further functional component of the motor vehicle, at least one of safety-relevant and relevant to legal provisions irrespective of the driving mode of the motor vehicle, with regard to whether the at least one further functional component has been at least one of replaced without authorization and manipulated without authorization.

3. The method as claimed in claim 2, further comprising controlling operation of the at least one further functional component of the motor vehicle, by selectively restricting at least one functionality of the at least one further functional component when the at least one further functional component has been at least one of replaced without authorization and manipulated without authorization.

4. The method as claimed in claim 3, wherein said controlling the operation of the at least one other functional component of the motor vehicle selectively restricts the at least one functionality of the at least one other functional component when the at least one further functional component has been at least one of replaced without authorization and manipulated without authorization.

5. The method as claimed in claim 2, wherein said controlling the operation of the at least one other functional component of the motor vehicle selectively restricts the at least one functionality of the at least one other functional component when the at least one further functional component has been at least one of replaced without authorization and manipulated without authorization.

6. The method as claimed in claim 2,
   further comprising performing a status query of a device preventing unauthorized activation of the motor vehicle before said authenticating of the at least one functional component and said authenticating of the at least one further functional component of the motor vehicle, and wherein said authenticating of the at least one functional component and said authenticating of the at least one further functional component of the motor vehicle are performed only when the status query reveals no unauthorized activation of the motor vehicle.

7. The method as claimed in claim 1, wherein the at least one other functional component is at least one of a multimedia device for outputting multimedia contents at least one of into an interior of the motor vehicle and to a communication partner, a communication device for establishing a communication connection between a motor vehicle control unit and a vehicle occupant mobile terminal, an air-conditioning device for air-conditioning at least one region of the interior of the motor vehicle, a seat adjustment device for adjusting at least one of orientation and position of at least one seat part of the motor vehicle relative to at least one other seat part of the motor vehicle, a seat temperature control device for controlling temperature of at least one seat part of the motor vehicle, a steering wheel temperature control device for controlling the temperature of at least one steering wheel part of the motor vehicle, an illumination device for illuminating the interior of the motor vehicle, and a parking assistance system for carrying out at least partially automated parking operations of the motor vehicle, and
    wherein said controlling selectively restricts the at least one other functional component when said authenticating reveals that the at least one functional component of the motor vehicle has been at least one of replaced without authorization and manipulated without authorization.

8. The method as claimed in claim 1, further comprising controlling operation of a further functional component of the motor vehicle, emission-relevant to the driving mode of the motor vehicle, by selectively restricting at least one functionality of the further functional component when said authenticating reveals that the at least one functional component of the motor vehicle has been at least one of replaced without authorization and manipulated without authorization.

9. The method as claimed in claim 8, further comprising outputting to a driver, before said controlling by restricting the at least one functionality of the further functional component, an item of restriction information describing an imminent restriction of the further functional component.

10. The method as claimed in claim 8, wherein the further functional component is an assistance system for at least one of at least partially automated longitudinal and lateral guidance of the motor vehicle, and
    wherein said controlling selectively restricts the at least one further functional component when said authenticating reveals that the at least one functional component of the motor vehicle has been at least one of replaced without authorization and manipulated without authorization.

11. The method as claimed in claim 1,
    further comprising repeating said authenticating up to a predetermined number of times when an authentication result cannot be obtained by said authenticating, and
    wherein said controlling selectively restricts the at least one functionality of the at least one other functional component of the motor vehicle when the authentication result is not obtained after carrying out said authenticating the predetermined number of times.

12. The method as claimed in claim 1, wherein said controlling selectively restricts the at least one functionality of the at least one other functional component of the motor vehicle when an authentication result is not obtained by said authenticating within a predetermined period of time.

13. The method as claimed in claim 1, wherein said authenticating is performed by an electrical energy store connected to a drive unit of the motor vehicle to authenticate the at least one functional component of the motor vehicle with regard to whether the at least one functional component has been at least one of replaced without authorization and manipulated without authorization.

14. A motor vehicle comprising:
    a plurality of different functional components; and
    at least one hardware processor configured
        to authenticate at least one first functional component, among the different functional components, which is at least one of safety-relevant and emission-relevant to a driving mode of the motor vehicle, with regard to whether the at least one first functional component has been at least one of replaced without authorization and manipulated without authorization, and
        to control operation of at least one second functional component among the different functional components of the motor vehicle, which is not safety-relevant to the driving mode of the motor vehicle, by selectively restricting at least one functionality of the at least one second functional component when authentication of the at least one first functional component of the motor vehicle indicates at least one of replacement without authorization and manipulation without authorization.

15. The motor vehicle as claimed in claim 14, wherein the motor vehicle has an interior and is capable of communication with a communication partner, including a vehicle occupant mobile terminal,
    wherein the motor vehicle further comprises seat parts, a steering wheel and a motor vehicle control unit,
    wherein the at least one second functional component is at least one of a multimedia device outputting multimedia content at least one of into the interior of the motor vehicle and to the communication partner, a communication device establishing a communication connection between the motor vehicle control unit and the vehicle occupant mobile terminal, an air-conditioning device for air-conditioning at least one region of the interior of the motor vehicle, a seat adjustment device for adjusting at least one of orientation and position of at least one of the seat parts of the motor vehicle relative to at least one other of the seat parts of the motor vehicle, a seat temperature control device for controlling temperature of at least one of the seat parts of the motor vehicle, a steering wheel temperature control device for controlling the temperature of at least one part of the steering wheel of the motor vehicle, an illumination device for illuminating the interior of the motor vehicle, and a parking assistance system for carrying out at least partially automated parking operations of the motor vehicle, and
    wherein said at least one hardware processor selectively restricts the at least one second functional component when the at least one first functional component of the motor vehicle has been at least one of replaced without authorization and manipulated without authorization.

16. The motor vehicle as claimed in claim 14,
    further comprising an emission-related component of the motor vehicle, and
    wherein said at least one hardware processor is further configured to selectively restrict at least one functionality of the emission-related component when the at least one first functional component of the motor vehicle has been at least one of replaced without authorization and manipulated without authorization.

17. The motor vehicle as claimed in claim 16, further comprising an output device outputting to a driver an item of restriction information describing an imminent restriction of the emission-related component before said at least one hardware processor restricts the at least one functionality of the emission-related component.

18. The motor vehicle as claimed in claim 16,
further comprising an assistance system for at least one of
  at least partially automated longitudinal and lateral guidance of the motor vehicle, and
wherein said at least one hardware processor is further configured to selectively restrict the assistance system when the at least one first functional component of the motor vehicle has been at least one of replaced without authorization and manipulated without authorization.

19. The motor vehicle as claimed in claim 14,
further comprising:
  a drive unit of the motor vehicle; and
  an electrical energy store, connected to the drive unit of the motor vehicle, and
wherein at least one of the at least one hardware processor is disposed in the electrical energy store and authenticates the at least one first functional component of the motor vehicle with regard to whether the at least one first functional component has been at least one of replaced without authorization and manipulated without authorization.

* * * * *